(12) United States Patent
Seo (10) Patent No.: US 8,475,327 B2
(45) Date of Patent: Jul. 2, 2013

(54) ACCELERATING SYSTEM FOR IMPROVING THE RUNNING SPEED OF A BICYCLE

(75) Inventor: Dal Won Seo, Siheung-si (KR)

(73) Assignee: Soltech Co., Ltd., Changwon-Si, Gyeongsangnam-Do (CN)

(*) Notice: Subject to any disclaimer, the term of this patent is extended or adjusted under 35 U.S.C. 154(b) by 0 days.

(21) Appl. No.: 13/224,770

(22) Filed: Sep. 2, 2011

(65) Prior Publication Data

US 2012/0225749 A1   Sep. 6, 2012

Related U.S. Application Data (63) Continuation of application No. PCT/KR2010/002246, filed on Apr. 13, 2010.

(30) Foreign Application Priority Data

Jan. 1, 2010 (KR) ......................... 10-2010-0000003

(51) Int. Cl.
*F16H 57/08* (2006.01)

(52) U.S. Cl.
USPC ......................................... 475/343

(58) Field of Classification Search
USPC .................................................. 475/331, 343
See application file for complete search history.

(56) References Cited

U.S. PATENT DOCUMENTS

| | | | |
|---|---|---|---|
| 2003/0130085 A1* | 7/2003 | Matsuo et al. | 475/331 |
| 2004/0072645 A1* | 4/2004 | Bortolin | 475/17 |
| 2008/0121452 A1* | 5/2008 | Bon | 180/205 |

* cited by examiner

*Primary Examiner* — Edwin A Young
(74) *Attorney, Agent, or Firm* — Roetzel & Andress; Michael J. Keller (57) ABSTRACT

An accelerating system for improving the running speed of a bicycle including: a main hub housing, a hub bush engaged with the main hub housing and having a sun gear, a gear cover having latches and having fixed shafts for rotatably supporting planetary gears in a meshing engagement with the sun gear, a gear housing having a ring gear with a gear-type engaging portion positioned on the hub shaft such that the planetary gears engage with the ring gear, a locker threadedly engaged with the gear-type engaging member, a hollow cylindrical auxiliary hub housing having an inner stage portion for receiving an outer periphery surface of the gear housing, and an auxiliary hub housing cover having a gear latch portion for engaging with the latches of the gear cover such that the auxiliary hub housing cover only rotates in one direction.

12 Claims, 7 Drawing Sheets

ACCELERATING SYSTEM FOR IMPROVING THE RUNNING SPEED OF A BICYCLE

This application is a continuation of International Patent Application No. PCT/KR2010/002246 filed Apr. 13, 2010. This invention claims the benefit of Korean Patent Application No. 10-2010-0000003 filed on Jan. 1, 2010, which is hereby incorporated by reference in its entirety.

BACKGROUND OF THE INVENTION

1. Field of the Invention

The present invention relates to an accelerating system for improving the running speed of a bicycle, which is capable of enhancing a rotational force of a drive wheel and is compatible with a conventional chain gear if so desired, by simply installing the accelerating system in a hub shaft of the chain-driven bicycle.

2. Description of the Prior Art

In general, bicycles have been used for a long time as traffic means along with the history of human development. Until recently, bicycles are used widely throughout the world for the purpose of sport, entertainment, tourism or outdoor recreation activity.

Typically, a bicycle comprises a body frame having a front wheel at a front part an a rear wheel (hereinafter, so called "drive wheel") at a rear part thereof, a pair of pedals fixed at both sides of a shaft of which a crank is axially fixed thereon, and a power transmission means to transfer the power generated by rotation of the pedals to the drive wheel via a chain. The power transmission means includes a driving sprocket mounted at the pedals, a driven sprocket having a latch for transmitting power toward the drive wheel, and the chain to connect the driving sprocket to the driven sprocket.

Recently, a variety of endeavors for improving the running speed of the bicycle have been proposed. For example, transmission systems for easily changing the position of the linking chain by installing the multi-step transmission sprocket assembly at a one side of the drive chain gear of the pedals and the drive wheel have been proposed.

Figure 1:
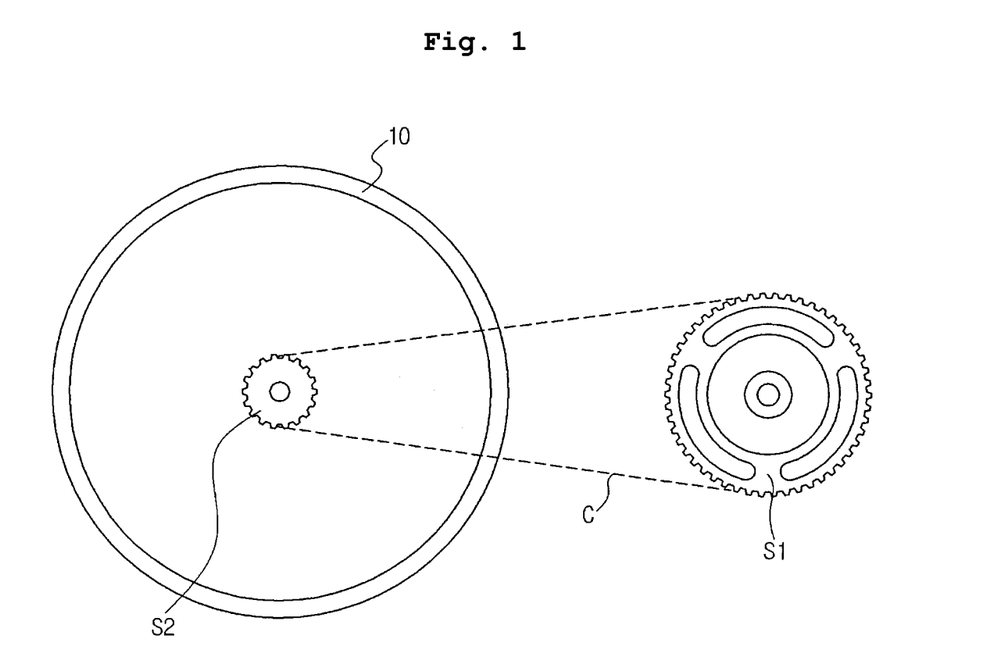
FIG. 1 is a schematic view for showing the power transmission between the front chain wheel and the rear drive wheel in a general bicycle.

FIG. 1 is a schematic view for showing the power transmission between the front chain wheel and the rear drive wheel in a general bicycle. As shown in FIG. 1, the conventional bicycle travels in the forward direction by a rotation power that is generated by rotating the pedals forward and transmitted through the chain (c) extending between the front chain gear (S1) mounted at the shaft of pedals and the rear chain gear (S2) mounted at the drive wheel 10.

Meanwhile, a small bicycle such as a folding bicycle has been developed for the purpose of simple transportation and safekeeping. The folding bicycle incorporates special design features such as small wheels and light body frame enabling the bike to fold into a compact form, thereby facilitating transport or storage.

However, one drawback of such conventional small bicycle is that the operation for increasing the running speed thereof is troublesome. Since this small bicycle is provided with small wheels, the user must to press down the pedals with all his or her force so as to quickly rotate the drive wheels. Accordingly, it is impossible to continuously increase the running speed of the bicycle. This results in the limitation use for the folding bicycle.

Although the user can drive the general bicycle having relatively large wheels at a higher speed faster than the running speed of the small bicycle having relatively small wheels, it is necessary to have much more power than the small bicycle requires the user do.

In order to solve these disadvantages, a variety of driving systems for a bicycle have been proposed. One approach is, a driving gear of bike including a planetary gear system has been proposed on Korean Registered Utility Model No. 20-418803 issued to Si-Cheol KIM on Jun. 8, 2006.

This utility model has suggested an improved internal structure for a bicycle such as tricycles for an infant or young children, unicycle, ordinary-type cycle, which did not have any planetary gear system for transmitting the driving power between the pedals and drive wheels. That is, this utility model employed the planetary gear system including a ring gear, a planetary gear and a sun gear so as to increase the running speed of the bicycle.

As well known in the related technical art, the planetary gear is engaged with the sun gear and it revolves around the sun gear. When the planetary gear is engaged with the ring gear and simultaneously rotates along the inner circumferential surface of the ring gear, it rotates on its axis. The planetary gear system is a sort of the transmission for the purpose of rapidly rotating a rotational body by allowing the sun gear to be rotated at a high speed.

In the above Korean Registered Utility Model employing the planetary gear system as described above, the planetary gear is mounted to the pedals so that the user directly presses down the pedals so as to rotate the drive wheels. Then, individual gears may rotate in proportion to the number of rotations of the pedals, thereby resulting in increase of the number of rotation of the wheels due to cooperative operation of the gears.

Since the planetary gear system is installed on the rotational shaft of which the pedals are fixed at both sides thereof in the bicycle such as tricycles for an infant or young children, unicycle, ordinary-type cycle as described above, the application thereof is practically limited depending on the design of bicycle. Another drawback of the conventional planetary gear system is that the running speed of the bicycle can not be substantially enhanced because the main power is generated by the pedals.

It is also known to provide another type of bicycle comprising the planetary gear system installed at the front chain gear (S1). In other words, the sun gear is mounted onto the rotational shaft of which a pair of pedals is fixed at both sides thereof, and three planetary gears are installed within a housing of which a ring gear is provided by using a fixed disk. When the pedals are stepped by the user for forward traveling, the shaft begins to rotate, which in turn rotates the chain gear (S1) and the sun gear. The planetary gears are engaged with the ring gear and they gradually travel along the ring gear, and thereby resulting in the transmitting of driving power via the chain to the drive wheel.

However, this type of bicycle is developed for the purpose of weight training or easily climbing an upward sloping road, but not improving the running speed of the bicycle. In other words, in order to enhance the physical health, the user can take up this type of bicycle employing the gear reduction structure which involves using gears/sprockets/pulleys of different sizes to work together. Also, if the user presses down the pedal of this bicycle with relatively small power, it is possible to easily climb an upward sloping road with riding this bicycle. However, this bicycle has still disadvantage that it has the planetary gear system which cannot be adapted to enhance the running speed of the bicycle.

In the meantime, another approach is, an accelerating system for improving the running speed of a bicycle has been proposed on Korean Patent Registered No. 10-0901436 issued to the present applicant on Jun. 1, 2009 with the title of "Accelerator for bicycle for driving speed elevation". However, one drawback of this conventional accelerator for bicycle is that the width dimension thereof in one lateral direction on the hub shaft is too large and thereby resulting in damage to the accelerator due to interference or collision with other objects during operation of the bicycle. Another drawback of the conventional accelerator for bicycle is that it may not be compatible with a conventional chain gear.

SUMMARY OF THE INVENTION

In consideration of the above-mentioned disadvantages or inconveniences of the conventional bicycle, an object of the present invention is to provide an accelerating system for improving the running speed of a bicycle, which is capable of increasing a rotational force of a drive wheel to the n-fold speed such as the double speed, threefold speed or the fourfold speed during operation of the bicycle, which is compatible with a conventional chain gear if so desired, which is capable of protecting itself against shocks acting from outside and of preventing interference or collision with other objects during operation of the bicycle, and which is capable of allowing a variety of gear systems to be installed therein, by simply installing the accelerating system in a hub shaft of the chain-driven bicycle.

In order to achieve the object, the present invention provides an accelerating system for improving the running speed of a bicycle of which a drive wheel is installed on a hub shaft extending between parts of a bicycle frame, in which a chain gear is mounted to a one side of the drive wheel and it is operatively connected to a drive chain gear mounted on a pedal of the bicycle via a chain extending there between, the improvement comprising:

a main hub housing having a central opening for receiving an engaging member, a first protrusion for guiding the engaging member into the central opening, in which the first protrusion is formed along a circumferential surface of the central opening on a one side surface of the main hub housing, and a second protrusion formed along a circumferential surface of the central opening on the other side surface of the main hub housing at a position opposite to the first protrusion;

a hub bush having a sun gear integrally formed along an outer circumferential surface at a one side thereof, the hub bush being in meshing engagement with the second protrusion of the main hub housing, in which a plurality of ball bearings may be installed onto the outer circumferential surface of the hub bush;

a ball guide bush being slideably mounted onto an outer surface of the hub bush;

a gear cover for increasing the rotational speeds of the sun gear and the main hub housing to the n-fold speed such as the double speed, threefold speed or the fourfold speed, the gear cover being engaged with the ball guide bush, the gear cover having a plurality of latches for guiding the rotation in one direction which are formed at a one side of an outer circumferential surface thereof, and a latch spring for supporting the latches which may be mounted onto the outer circumferential surface of the gear cover, the gear cover including a plurality of fixed shafts for rotatably supporting a plurality of planetary gears to be in meshing engagement with the sun gear with the aid of a plurality of bearings, in which the fixed shafts are formed at a one side of the gear cover;

a gear housing having a ring gear formed at an inner circumferential surface of a one side thereof, and a gear-type engaging portion formed at an inner circumferential surface of a central opening of the gear housing, in which the planetary gears of the gear cover may be in meshing engagement with the ring gear of the gear housing, and in which the gear housing may be supported on the hub shaft due to operation of the engaging portion;

a locker having a female thread formed at an inner circumferential surface thereof, a plurality of engaging protrusions formed at an outer circumferential surface of a one side of the locker, and an insertion guiding portion formed at the other side of the locker, in which the female thread may be threadedly engaged with the engaging member provided onto the hub shaft, in which the engaging protrusions may be in meshing engagement with the engaging portions of the gear housing, and in which the insertion guiding portion may be inserted into the hub bush together with a bush ring;

a hollow cylindrical auxiliary hub housing having an inner stage portion for receiving an outer periphery surface of the gear housing; and an auxiliary hub housing cover having a gear latch portion formed at an inner circumferential surface thereof, in which the latches of the gear cover may be in meshing engagement with the gear latch portion in a manner that they can rotate in a one direction along the gear latch portion.

As described above, the an accelerating system for improving the running speed of a bicycle according to the present invention comprises a ring gear, a planetary gear and a sun gear and it can by simply installed in the hub housing of the drive wheel. This accelerating system allows a general bicycle, more particularly, a small bicycle, which may employ a transmission drive chain or a conventional drive chain, for the easy acceleration in a manner far more efficient than heretofore known. Consequently, the running speed of the bicycle may be increased to the n-fold speed such as the double speed, threefold speed or the fourfold speed during operation of the bicycle by using only the force required to complete one rotation of the pedals due to the improvement of the rotational speed of the drive chain wheel. Furthermore, the accelerating system according to the present invention is compatible with a conventional chain gear if so desired so that a variety of gear systems can be installed at the hub shaft of the bicycle so as to increase the running speed of the bicycle. Furthermore, the accelerating system according to the present invention can protect itself against shocks acting from outside and it can prevent interference or collision with other objects during operation of the bicycle.

BRIEF DESCRIPTION OF THE DRAWINGS

The above object and other characteristics and advantages of the present invention will become more apparent by describing in detail a preferred embodiment thereof with reference to the attached drawings, in which.

DETAILED DESCRIPTION OF THE INVENTION

Hereinafter, the constitution and the operation of an accelerating system for improving the running speed of a bicycle according to a preferred embodiment of the present invention will be explained in more detail with reference to the accompanying drawings FIGS. 2 to 7.

Prior to proceeding to the more detailed description of the preferred embodiment according to the present invention, it should be noted that, for the sake of clarity and understanding of the invention identical components which have identical functions have been identified with identical reference numerals throughout the different views which are illustrated in each of the attached drawing Figures.

Referring to FIGS. 2 to 5, the present invention relates to an accelerating system 100 for improving the running speed of a bicycle of which a drive wheel 10 is installed on a hub shaft extending between parts of a bicycle frame 1, in which a second chain gear (S2) is mounted to a one side of the drive wheel 10 and it is operatively connected to a first chain gear (S1) mounted to pedals of the bicycle via a chain (C) extending there between.

Figure 3:
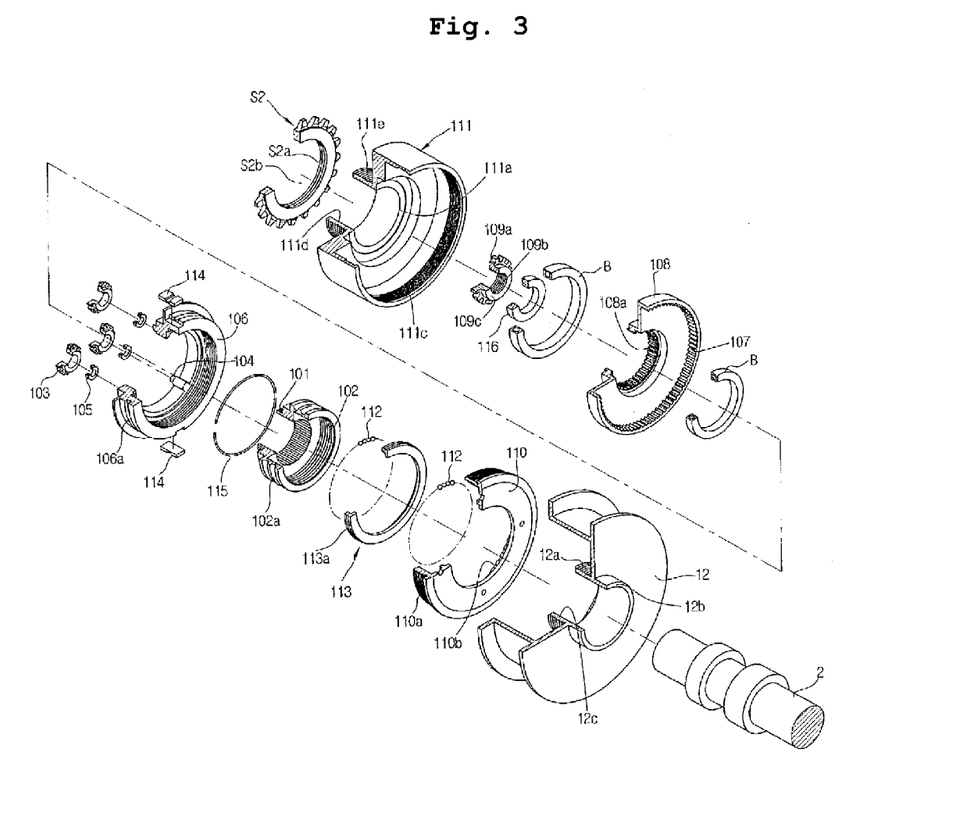
FIG. 3 is an exploded perspective view of the accelerating system for improving the running speed of a bicycle according to the preferred embodiment of the present invention.
Figure 4:
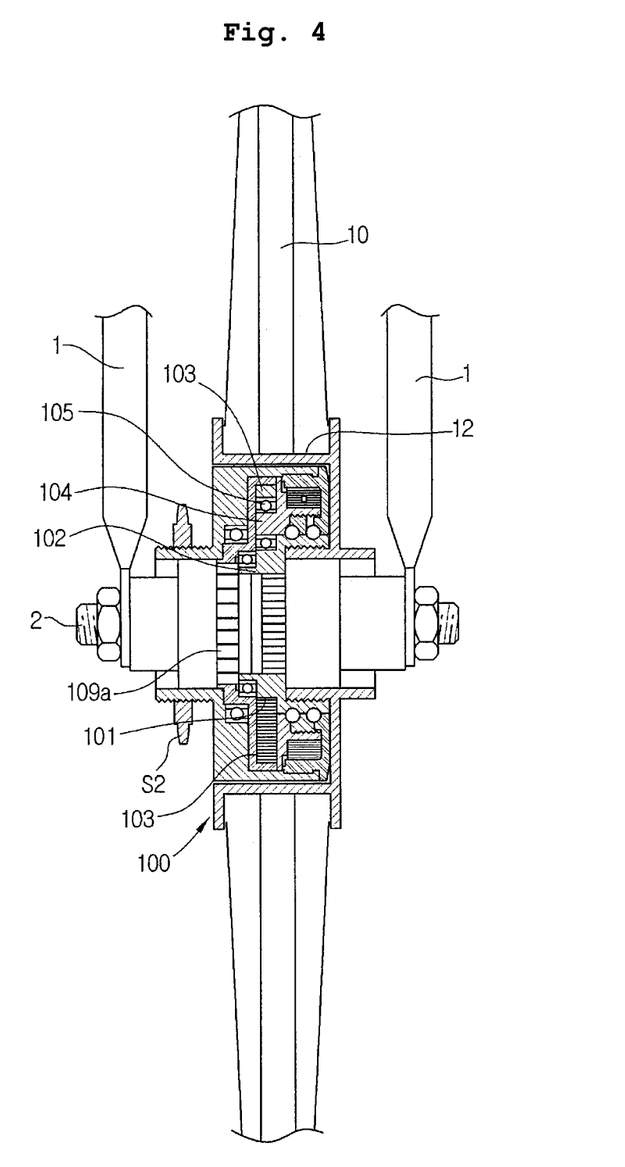
FIG. 4 is a longitudinal sectional view for showing the assembled state of the accelerating system mounted on the hub shaft.
Figure 5:
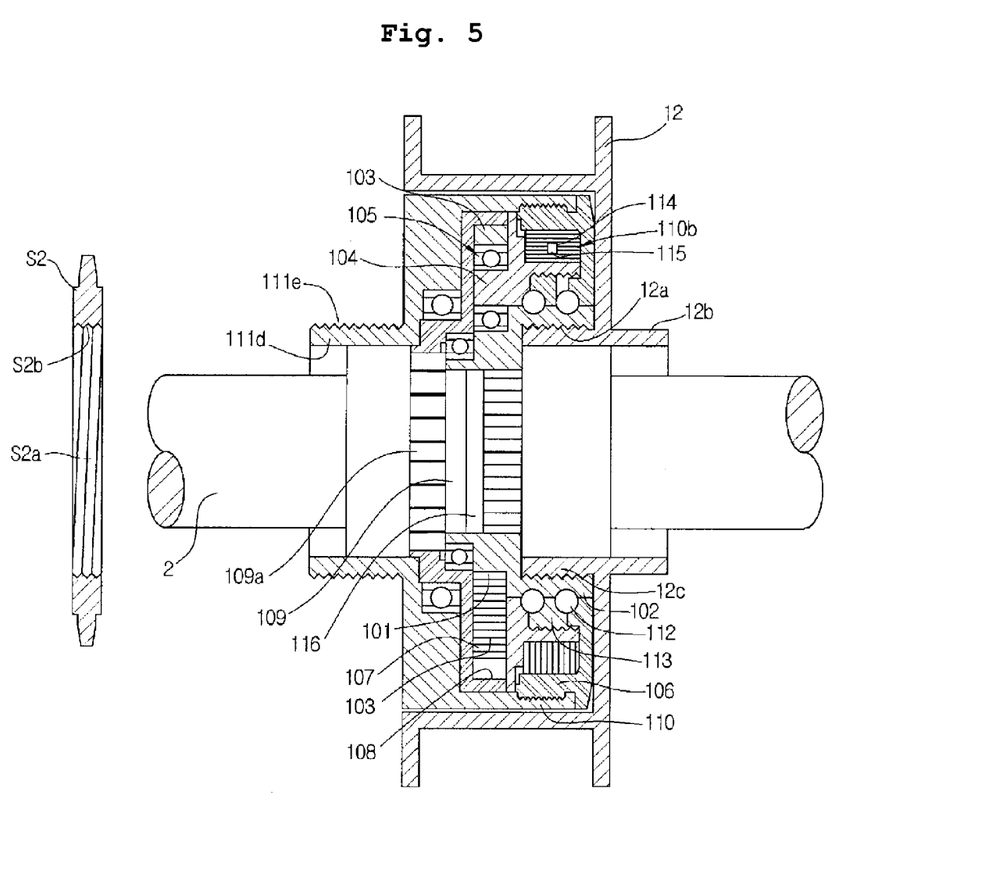
FIG. 5 is a partially enlarged sectional view of an important part of the accelerating system illustrated in FIG. 4.

The accelerating system 100 mainly comprises a main hub housing 12, a hub bush 102, a ball guide bush 113, a gear cover 106, a gear housing 108, a locker 109, a hollow cylindrical auxiliary hub housing 111 and an auxiliary hub housing cover 110.

The main hub housing 12 has a central opening for receiving an engaging member 2, a first protrusion 12b for guiding the engaging member 2 into the central opening, in which the first protrusion 12b is formed along a circumferential surface of the central opening on a one side surface of the main hub housing 12, and a second protrusion 12c formed along a circumferential surface of the central opening on the other side surface of the main hub housing 12 at a position opposite to the first protrusion 12b. A central portion of the other side surface of the main hub housing 12 is recessed toward the one side surface of the main hub housing 12. A screw thread 12a is formed at an outer circumferential surface of the second protrusion 12c and thereby the second protrusion 12c may be threadedly engaged into the hub bush 102.

The hub bush 102 includes a sun gear 101 integrally formed along an outer circumferential surface at a one side thereof. The hub bush 102 is in meshing engagement with the screw thread 12a of the main hub housing 12, in which a plurality of ball bearings 112 may be installed into bearing guide grooves 102a formed on an outer circumferential surface of the hub bush 102.

The ball guide bush 113 includes a mail thread 113a formed at an outer circumferential surface thereof. The ball guide bush 113 is slideably mounted onto an outer surface of the hub bush 102 so that the ball bearings 112 may be located between a radial inner surface of the ball guide bush 113 and the radial outer surface of the hub bush 102.

The gear cover 106 is engaged with a mail thread 113a formed on an outer circumferential surface of the ball guide bush 113. The gear cover 106 has a plurality of latches 114 for guiding the rotation in one direction which are formed at a one side of an outer circumferential surface thereof, and a C-shaped latch spring 115 for supporting the latches 114 which may be mounted onto the outer circumferential surface of the gear cover 106. The gear cover 106 includes a plurality of fixed shafts 104 for rotatably supporting a plurality of planetary gears 103 to be in meshing engagement with the sun gear 101 with the aid of a plurality of bearings 105. The fixed shafts 104 are formed at a one side of the gear cover 106.

The gear housing 108 has a ring gear 107 formed at an inner circumferential surface of a one side thereof, and a gear-type engaging portion 108a formed at an inner circumferential surface of a central opening of the gear housing 108. The planetary gears 103 of the gear cover 106 may be in meshing engagement with the ring gear 107 of the gear housing 108. The gear housing 108 may be supported on the hub shaft due to operation of the engaging portion 108a.

The locker 109 has a female thread 109b formed at an inner circumferential surface thereof, a plurality of engaging protrusions 109a formed at an outer circumferential surface of a one side of the locker 109, and an insertion guiding portion 109c formed at the other side of the locker 109. The female thread 109b may be threadedly engaged with an engaging portion 2 provided onto the main hub housing 12. The engaging protrusions 109a may be in meshing engagement with the engaging portions 108a of the gear housing 108. The insertion guiding portion 109c may be inserted into the hub bush 102 together with a bush ring 116. The bush ring 116 is adapted to act as lubricating means between the insertion guiding portion 109c of the locker 109 and a side surface of the sun gear 101 formed at the hub bush 102.

A hollow cylindrical auxiliary hub housing 111 includes an open one side surface and a protrusion 111d protruding from the other side surface of the auxiliary hub housing 111. The auxiliary hub housing 111 has an inner stage portion 111a for receiving an outer periphery surface of the gear housing 108. The auxiliary hub housing 111 may be inserted into the opened one side of the main hub housing 12. The protrusion 111d has a through hole formed there through and a screw thread 111e formed at an outer circumferential surface thereof. A chain gear (S2) may be threadedly engaged onto the screw thread 111e of the protrusion 111d. A female thread (S2a) is formed at an inner circumferential surface of the chain gear (S2). The reference character "S2b" represents a central opening of the chain gear (S2). A female thread 111c is formed at an inner circumferential surface of the auxiliary hub housing 111.

The auxiliary hub housing cover 110 has a mail thread 110a formed at an outer circumferential surface thereof which may be threadedly engaged with the female thread 111c of the auxiliary hub housing 111, and a gear latch portion 110b formed at an inner circumferential surface thereof, in which the latches 114 of the gear cover 106 may be in meshing engagement with the gear latch portion 110b in a manner that they can rotate in a one direction along the gear latch portion 110b.

In FIG. 3, a reference character "B" (not illustrated in the above) represents a bearing which may be disposed between the locker 109 and the gear housing 108, and between the gear housing 108 and the auxiliary hub housing 111.

Having described the accelerating system 100 for improving the running speed of a bicycle according to the preferred embodiment of the present invention in detail, the operation of the accelerating system 100 can be understood as follows.

Figure 2:
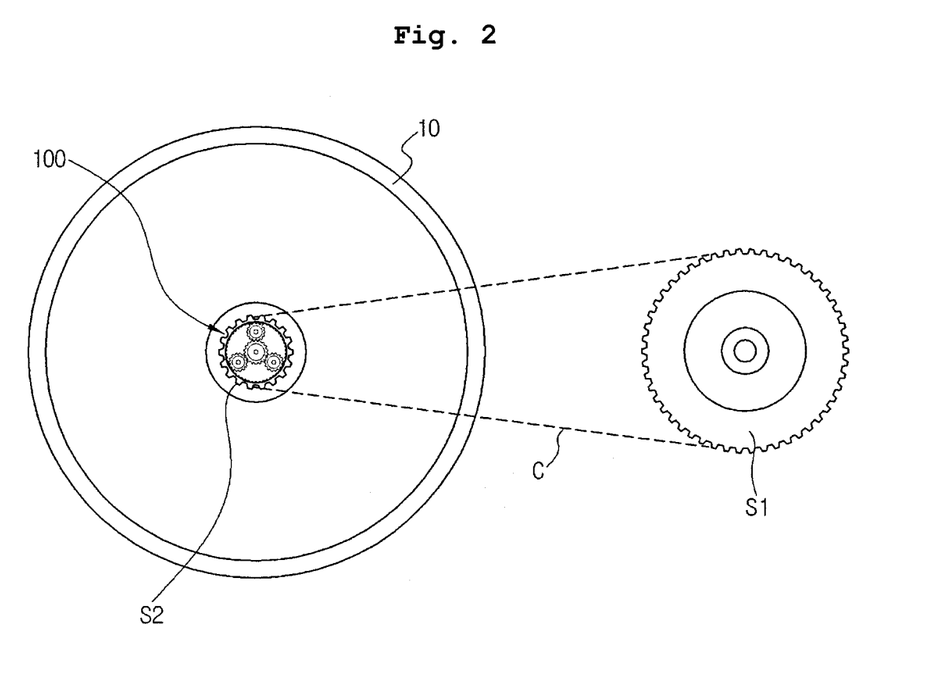
FIG. 2 is a schematic view for showing the power transmission between the front chain wheel and the rear drive wheel in a bicycle of which an accelerating system for improving the running speed according to a preferred embodiment of the present invention is mounted on the hub shaft of the rear drive wheel.

When the pedals of a bicycle are stepped by the user for forward traveling, the driving power created due to operation of the pedals is transmitted to the rear drive wheel 10 via the chain (C) extending between the front chain gear (S1) mounted to the shaft and the rear chain gear (S2) mounted to the drive wheel 10, as shown in FIG. 2. At this time, the gear speed ratio of the front chain gear (S1):the rear chain gear (S2) is 1:3. This difference of gear speed ratio is caused by the difference of diameter between the large chain gear (S1) and the small chain gear (S2). In other words, the gear speed ratio is inversely proportional to ratio of the gear diameters.

The front chain gear (S1) is operatively connected to the rear chain gear (S2) mounted to the drive wheel 10 via the chain (C). Accordingly, every time the pedals rotate once, the drive wheel 10 can rotate several times and resulting in increase of the rotational speed of the drive wheel 10.

As well known in the related technical art, the gear ratio is the relationship between the number of teeth on two gears that are meshed or two sprockets connected with a common roller chain, or the circumferences of two pulleys connected with a drive belt.

According to the present invention, the number of rotation of the sun gear 101 integrally formed at the one side of the hub bush 102 can be increased by increasing the number of teeth on the planetary gear 103 installed at the gear cover 106 as compared with the number of teeth on the sun gear 101.

As the number of teeth on the planetary gear 103 is increased, the number of teeth on the ring gear 107 to be in meshing engagement with the planetary gear 103 is further increased more than that of the planetary gear 103. Thereby, the number of rotation of the sun gear 101, which is in meshing engagement with the ring gear 107 of the gear housing 108, is also increased. Since the sun gear 101 is directly mounted onto the main hub housing 12, it is possible to increase the rotational speed of the drive wheel 10 in a manner that every time the first chain gear (S1) rotates once, the drive wheel 10 rotates several times. The increase of the rotational speed of the drive wheels 10 can be accomplished by the rotation of the second chain gear (S2) via the chain (C). Accordingly, the forwarding speed of the bicycle can be increased by the uniform force required to complete one rotation of the pedals.

When the drive wheel 10 rotates, the auxiliary hub housing 111 also rotates together with the auxiliary hub housing cover 110, which is engaged with the auxiliary hub housing 111 by means of the chain gear (S2). At this time, the gear latch portion 110b formed at the inner circumferential surface of the auxiliary hub housing cover 110 rotates in one direction due to operation of the latch 114 disposed at the outer circumferential surface of the gear cover 106. Then, the gear cover 106 rotates together with the ball guide bush 113, with meshing of the female thread formed at the inner circumferential surface of the gear cover 106 with the male thread 113a of the ball guide bush 113. At this time, the ball bearings 112 slidingly disposed onto the outer circumferential surface of the ball guide bush 113 can reduce the rotational friction to be generated during rotating of the sun gear 101 of the hub bush 102 mounted to the main hub housing 12.

Figure 6:
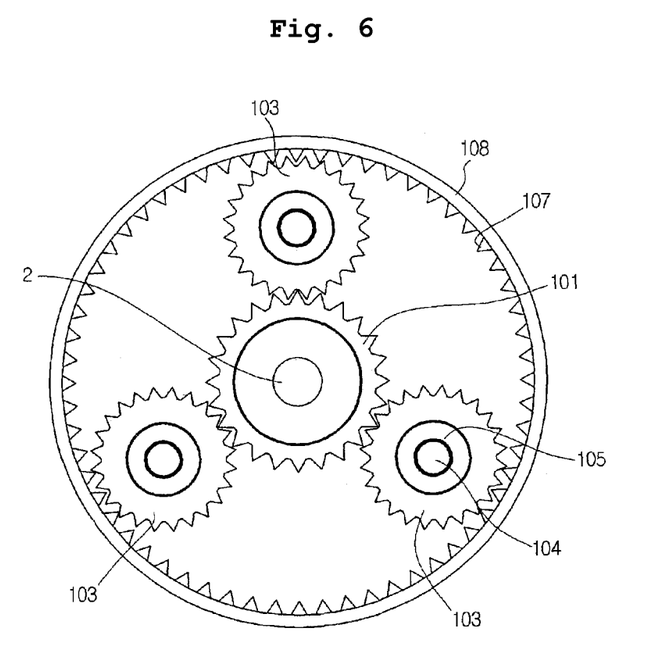
FIGS. 6 and 7 show operational states of the important part in the accelerating system for improving the running speed of a bicycle according to the preferred embodiment of the present invention.
Figure 7:
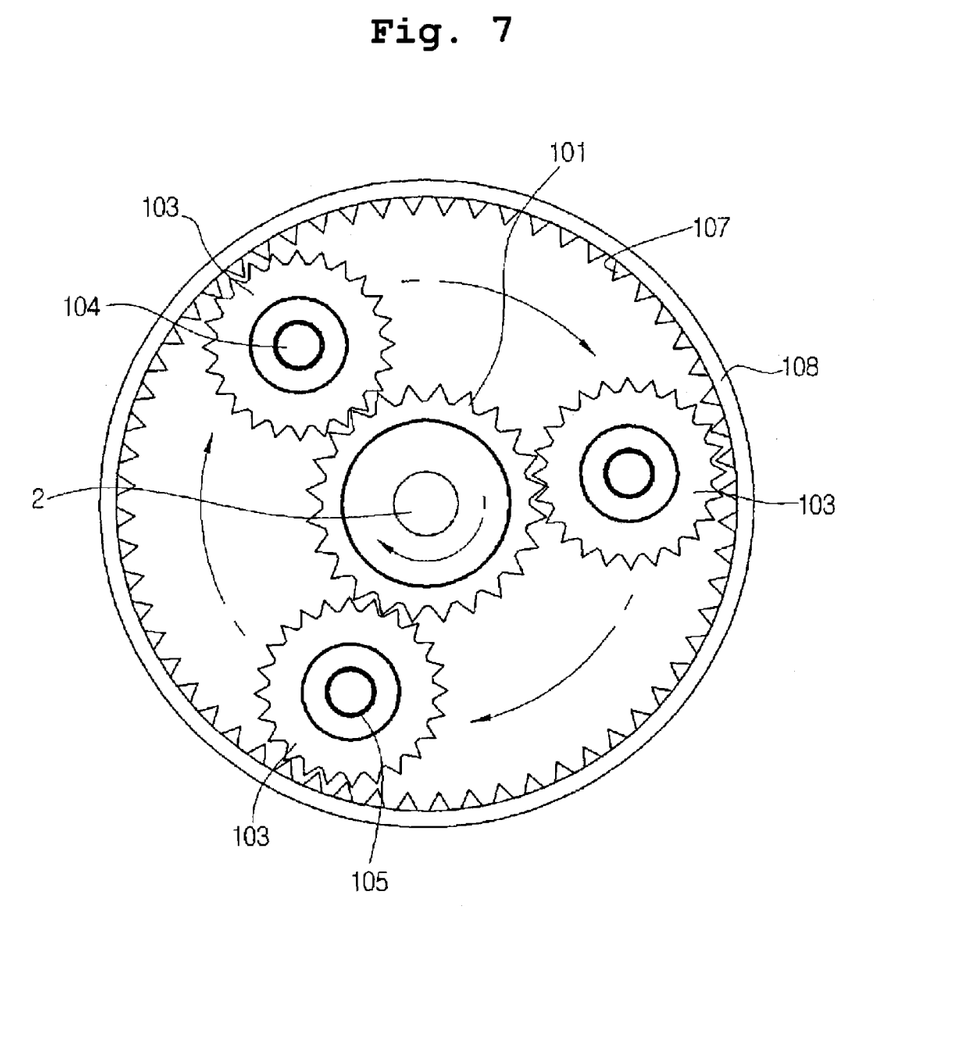

FIG. 6 show an operational state of the important part in the accelerating system before operating the drive wheel 10. FIG. 7 show an operational state of the important part in the accelerating system that the sun gear 101 installed on the main hub housing 12 is in meshing engagement with pluralities of planetary gears 103 so as to increase the rotational speed of the main hub housing 12 and the sun gear 101. As well known in the related art, the planetary gear 103 is operatively mounted onto the fixed shaft 104 of the gear cover 106 through the bearing 105 and it smoothly rotates on its axis with the aid of the bearing 105. At the same time, the planetary gear 103 is in meshing engagement with the sun gear 101 and it revolves around the sun gear 101. Also, when the planetary gear 103 is in meshing engagement with the ring gear 107 of the gear housing 108 and rotates along the inner circumferential surface of the ring gear 107, it rotates on its axis. The rotational power generated by this operation of the planetary gear 103 may be transmitted to the main hub housing 12 of the drive wheel 10 on which the sun gear 101 is coaxially connected thereto, thereby resulting in the increase of rotational speed of the main hub housing 12 and the sun gear 101. As a result, the main hub housing 12 of which the drive wheel 10 is installed thereon can rotate at a rotational speed faster than the conventional speed in the steady state. Accordingly, in the present invention employing the accelerating system as described above, every time the pedals rotate once, the forward speed of the drive wheel 10 of the bicycle may be increased around at least two times in comparison with the general bicycle.

As described above, the accelerating system for improving the running speed of the bicycle is capable of allowing a general bicycle, more particularly, a small bicycle for the easy acceleration in a manner far more efficient than heretofore known, by simply installing it at a one side of a drive chain wheel axially fixed on the hub shaft of the bicycle of which the first chain gear (S1) is mounted at the pedals and the second chain gear (S2) is mounted at the drive wheel 10. Accordingly, it permits a more efficient rate of pedal travel to be established during the pedal power portion of the crank arm cycle.

Due to the improvement of the rotational speed of the drive wheel 10, it is possible to increase the running speed of the bicycle at least two times by using only the force required to complete one rotation of the pedals. Therefore, it allows for the conveniently use of the bicycle in a manner far more efficient than heretofore known without feeling as bored and tired as riding the prior art bicycle.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An accelerating system for improving the running speed of a bicycle of which a drive wheel is installed on a hub shaft extending between parts of a bicycle frame, in which a chain gear is mounted to a one side of the drive wheel and it is operatively connected to a drive chain gear mounted on a pedal of the bicycle via a chain extending there between, the improvement comprising:

a main hub housing having a central opening for receiving an engaging member, a first protrusion for guiding the engaging member into the central opening, in which the first protrusion is formed along a circumferential surface of the central opening on a one side surface of the main hub housing, and a second protrusion formed along a circumferential surface of the central opening on the other side surface of the main hub housing at a position opposite to the first protrusion;

a hub bush having a sun gear integrally formed along an outer circumferential surface at a one side thereof, the hub bush being in meshing engagement with the second protrusion of the main hub housing, in which a plurality of ball bearings may be installed onto the outer circumferential surface of the hub bush;

a ball guide bush being slideably mounted onto an outer surface of the hub bush;

a gear cover for increasing the rotational speeds of the sun gear and the main hub housing to the n-fold speed, where n is a positive integer between 2 and 4, the gear cover being engaged with the ball guide bush, the gear cover having a plurality of latches for guiding the rotation in one direction which are formed at a one side of an outer circumferential surface thereof, and a latch spring for supporting the latches which may be mounted onto the outer circumferential surface of the gear cover, the gear cover including a plurality of fixed shafts for rotatably supporting a plurality of planetary gears to be in meshing engagement with the sun gear with the aid of a plurality of bearings, in which the fixed shafts are formed at a one side of the gear cover;

a gear housing having a ring gear formed at an inner circumferential surface of a one side thereof, and a gear-type engaging portion formed at an inner circumferential surface of a central opening of the gear housing, in which the planetary gears of the gear cover may be in meshing engagement with the ring gear of the gear housing, and in which the gear housing may be supported on the main hub housing due to operation of the engaging portion;

a locker having a female thread formed at an inner circumferential surface thereof, a plurality of engaging protrusions formed at an outer circumferential surface of a one side of the locker, and an insertion guiding portion formed at the other side of the locker, in which the female thread may be threadedly engaged with the engaging member provided onto the main hub housing, in which the engaging protrusions may be in meshing engagement with the engaging portions of the gear housing, and in which the insertion guiding portion may be inserted into the hub bush together with a bush ring;

a hollow cylindrical auxiliary hub housing having an inner stage portion for receiving an outer periphery surface of the gear housing; and an auxiliary hub housing cover having a gear latch portion formed at an inner circumferential surface thereof, in which the latches of the gear cover may be in meshing engagement with the gear latch portion in a manner that they can rotate in a one direction along the gear latch portion.

2. The accelerating system for improving the running speed of a bicycle as claimed in claim 1, wherein the auxiliary hub housing includes an open one side surface and a protrusion protruding from the other side surface of the auxiliary hub housing, whereby the auxiliary hub housing may be inserted into the open one side surface of the main hub housing through the open one side surface thereof, and wherein the protrusion has a through hole formed there through and it has a screw thread formed at an outer circumferential surface thereof, whereby a chain gear may be threadly engaged onto the screw thread of the protrusion.

3. The accelerating system for improving the running speed of a bicycle of claim 2 in which the n-fold speed of the sun gear and the main hub housing is between 2 and 3.

4. The accelerating system for improving the running speed of a bicycle of claim 2 in which the n-fold speed of the sun gear and the main hub housing is between 3 and 4.

5. The accelerating system for improving the running speed of a bicycle of claim 2 in which the n-fold speed of the sun gear and the main hub housing is about 2.

6. The accelerating system for improving the running speed of a bicycle of claim 2 in which the n-fold speed of the sun gear and the main hub housing is about 3.

7. The accelerating system for improving the running speed of a bicycle of claim 2 in which the n-fold speed of the sun gear and the main hub housing is about 4.

8. The accelerating system for improving the running speed of a bicycle of claim 1 in which the n-fold speed of the sun gear and the main hub housing is between 2 and 3.

9. The accelerating system for improving the running speed of a bicycle of claim 1 in which the n-fold speed of the sun gear and the main hub housing is between 3 and 4.

10. The accelerating system for improving the running speed of a bicycle of claim 1 in which the n-fold speed of the sun gear and the main hub housing is about 2.

11. The accelerating system for improving the running speed of a bicycle of claim 1 in which the n-fold speed of the sun gear and the main hub housing is about 3.

12. The accelerating system for improving the running speed of a bicycle of claim 1 in which the n-fold speed of the sun gear and the main hub housing is about 4.

* * * * *

UNITED STATES PATENT AND TRADEMARK OFFICE
CERTIFICATE OF CORRECTION

PATENT NO. : 8,475,327 B2  
APPLICATION NO. : 13/224770  
DATED : July 2, 2013  
INVENTOR(S) : Dal Won Seo Page 1 of 1

It is certified that error appears in the above-identified patent and that said Letters Patent is hereby corrected as shown below:

On the Title Page of the patent, please delete the Assignee Name "Soltech Co., Ltd." replace with -- Fxgear Co., Ltd. --.

Signed and Sealed this  
Sixth Day of August, 2013

Teresa Stanek Rea  
*Acting Director of the United States Patent and Trademark Office*